(12) United States Patent
Torii

(10) Patent No.: US 10,279,683 B2
(45) Date of Patent: May 7, 2019

(54) VEHICLE DISPLAY SYSTEM AND METHOD OF CONTROLLING VEHICLE DISPLAY SYSTEM

(71) Applicant: SUBARU CORPORATION, Tokyo (JP)

(72) Inventor: Takeshi Torii, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/898,269

(22) Filed: Feb. 16, 2018

(65) Prior Publication Data

US 2018/0264945 A1 Sep. 20, 2018

(30) Foreign Application Priority Data

Mar. 15, 2017 (JP) .................................. 2017-050349

(51) Int. Cl.
*B60Q 1/00* (2006.01)
*B60K 35/00* (2006.01)
(Continued)

(52) U.S. Cl.
CPC .............. *B60K 35/00* (2013.01); *G02B 27/01* (2013.01); *G02B 27/0101* (2013.01); *G06K 9/00302* (2013.01); *G06K 9/00369* (2013.01); *G06K 9/00791* (2013.01); *G08G 1/0962* (2013.01); *G08G 1/096716* (2013.01); *G08G 1/096775* (2013.01); *G08G 1/166* (2013.01);
(Continued)

(58) Field of Classification Search
CPC . G07C 5/008; G07C 5/00; G07C 5/02; G07C 5/06; G07C 5/0816; G07C 9/00111; G07C 1/10; G07C 1/24; G07C 2009/00507; G07C 5/006; G07C 5/08; G07C 5/0808; G07C 5/085; G07C 9/00309; G08G 1/202
USPC ..... 340/438, 901–903, 425.5, 426.1, 426.34, 340/426.28, 905, 427, 426.22, 435–436, 340/455, 463, 468, 525, 534–535, 539.22
See application file for complete search history.

(56) References Cited

U.S. PATENT DOCUMENTS

| 2003/0098211 A1* | 5/2003 | Saito .................. B60G 17/0185 191/3 |
| 2007/0038344 A1* | 2/2007 | Oota .................... B60R 25/2009 701/49 |

(Continued)

FOREIGN PATENT DOCUMENTS

| JP | 2016-136199 | * | 1/2015 |
| JP | 2016-136199 A | | 7/2016 |

(Continued)

OTHER PUBLICATIONS

Japanese Office Action issued in corresponding Japanese Patent Application No. 2017-050349, dated Sep. 11, 2018, with English Translation.

*Primary Examiner* — Daniel Previl
(74) *Attorney, Agent, or Firm* — McDermott Will & Emery LLP

(57) ABSTRACT

A vehicle display system includes a display device, a determiner, and a display controller. The display device provides a display on a window of a vehicle. The determiner determines whether a driver of the vehicle comes close to the vehicle. The display controller controls the display device to provide the display for an outside of the vehicle, when the determiner determines that the driver of the vehicle comes close to the vehicle.

15 Claims, 11 Drawing Sheets

(51) Int. Cl.
*G06K 9/00* (2006.01)
*G08G 1/16* (2006.01)
*G02B 27/01* (2006.01)
*G08G 1/0962* (2006.01)
*G08G 1/0967* (2006.01)

(52) U.S. Cl.
CPC ........... *B60K 2350/1096* (2013.01); *B60K 2350/965* (2013.01); *B60R 2300/205* (2013.01); *G02B 2027/0138* (2013.01); *G02B 2027/0141* (2013.01); *G06K 9/00832* (2013.01)

(56) References Cited

U.S. PATENT DOCUMENTS

| | | | | |
|---|---|---|---|---|
| 2007/0040705 | A1* | 2/2007 | Yoshioka | G01C 21/00 340/988 |
| 2010/0253594 | A1* | 10/2010 | Szczerba | G01S 13/723 345/7 |
| 2011/0083075 | A1* | 4/2011 | MacNeille | B60K 37/06 715/728 |
| 2012/0268264 | A1* | 10/2012 | Son | G08B 13/1427 340/457 |
| 2014/0309806 | A1* | 10/2014 | Ricci | B60Q 1/00 701/1 |
| 2016/0066127 | A1* | 3/2016 | Choi | H04W 4/008 455/41.2 |
| 2016/0189435 | A1* | 6/2016 | Beaurepaire | G05D 1/021 705/13 |

FOREIGN PATENT DOCUMENTS

| | | | |
|---|---|---|---|
| JP | 2016136199 | * | 7/2016 |
| JP | 2017-177883 A | | 10/2017 |

\* cited by examiner

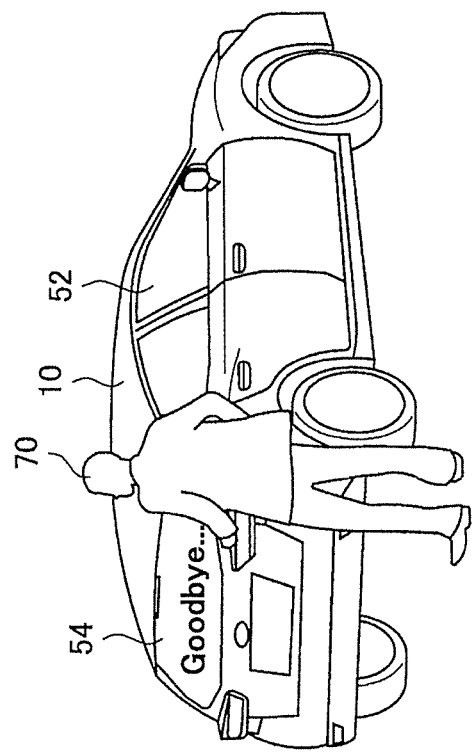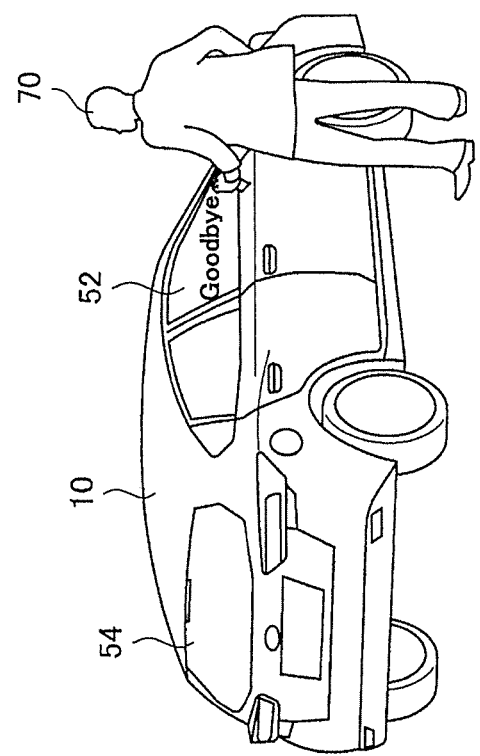
FIG. 11

200~000~000~000~000~000~000~000~000~000~000~000~000~000

VEHICLE DISPLAY SYSTEM AND METHOD OF CONTROLLING VEHICLE DISPLAY SYSTEM

CROSS-REFERENCE TO RELATED APPLICATIONS

The present application claims priority from Japanese Patent Application No. 2017-050349 filed on Mar. 15, 2017, the entire contents of which are hereby incorporated by reference.

BACKGROUND

The technology relates to a vehicle display system and a method of controlling the vehicle display system.

Japanese Unexamined Patent Application Publication (JP-A) No. 2016-136199 discloses an exemplary technique associated with displaying of a head-up display (HUD). In this technique, when an accessory (ACC) power supply of a vehicle is on, the HUD provides a regular-mode display within a driver's front field of view.

In the above technique, when the ACC power supply is off, the HUD provides a security-mode display on a windshield of the vehicle so that a person outside the vehicle is able to view this display.

SUMMARY

An aspect of the technology provides a vehicle display system that includes: a display device configured to provide a display on a window of a vehicle; a determiner configured to determine whether a driver of the vehicle comes close to the vehicle; and a display controller configured to control the display device to provide the display for an outside of the vehicle, when the determiner determines that the driver of the vehicle comes close to the vehicle.

An aspect of the technology provides a vehicle display system that includes: a display device configured to provide a display on a window of a vehicle; a driver boarding determiner configured to determine whether a driver boards the vehicle; and a display controller configured to control the display device to provide a display for an inside of the vehicle when the driver boarding determiner determines that the driver boards the vehicle, and to provide the display for an outside of the vehicle when the driver boarding determiner determines that the driver exits the vehicle.

An aspect of the technology provides a method of controlling a vehicle display system. The method includes: determining whether a driver of a vehicle comes close to the vehicle, in which the vehicle includes a display device that provides a display on a window of the vehicle; and controlling the display device to provide the display for an outside of the vehicle, when the driver is determined as coming close to the vehicle.

An aspect of the technology provides a method of controlling a vehicle display system. The method includes: determining whether a driver boards a vehicle, in which the vehicle includes a display device that provides a display on a window of the vehicle; and controlling the display device to provide a display for an inside of the vehicle when the driver is determined as boarding the vehicle, and to provide the display for an outside of the vehicle when the driver is determined as exiting the vehicle.

An aspect of the technology provides a vehicle display system that includes: a display device configured to provide a display on a window of a vehicle; and circuitry configured to determine whether a driver of the vehicle comes close to the vehicle, and control the display device to provide the display for an outside of the vehicle, when the driver is determined as coming close to the vehicle.

An aspect of the technology provides a vehicle display system that includes: a display device configured to provide a display on a window of a vehicle; and circuitry configured to determine whether a driver boards the vehicle, and control the display device to provide a display for an inside of the vehicle when the driver is determined as boarding the vehicle, and to provide the display for an outside of the vehicle when the driver is determined as exiting the vehicle.

BRIEF DESCRIPTION OF THE DRAWINGS

FIG. 11 schematically illustrates examples in which a window on which a display is to be provided is switched to another window, depending on a position of the driver moving around the vehicle.

DETAILED DESCRIPTION

Figure 1:
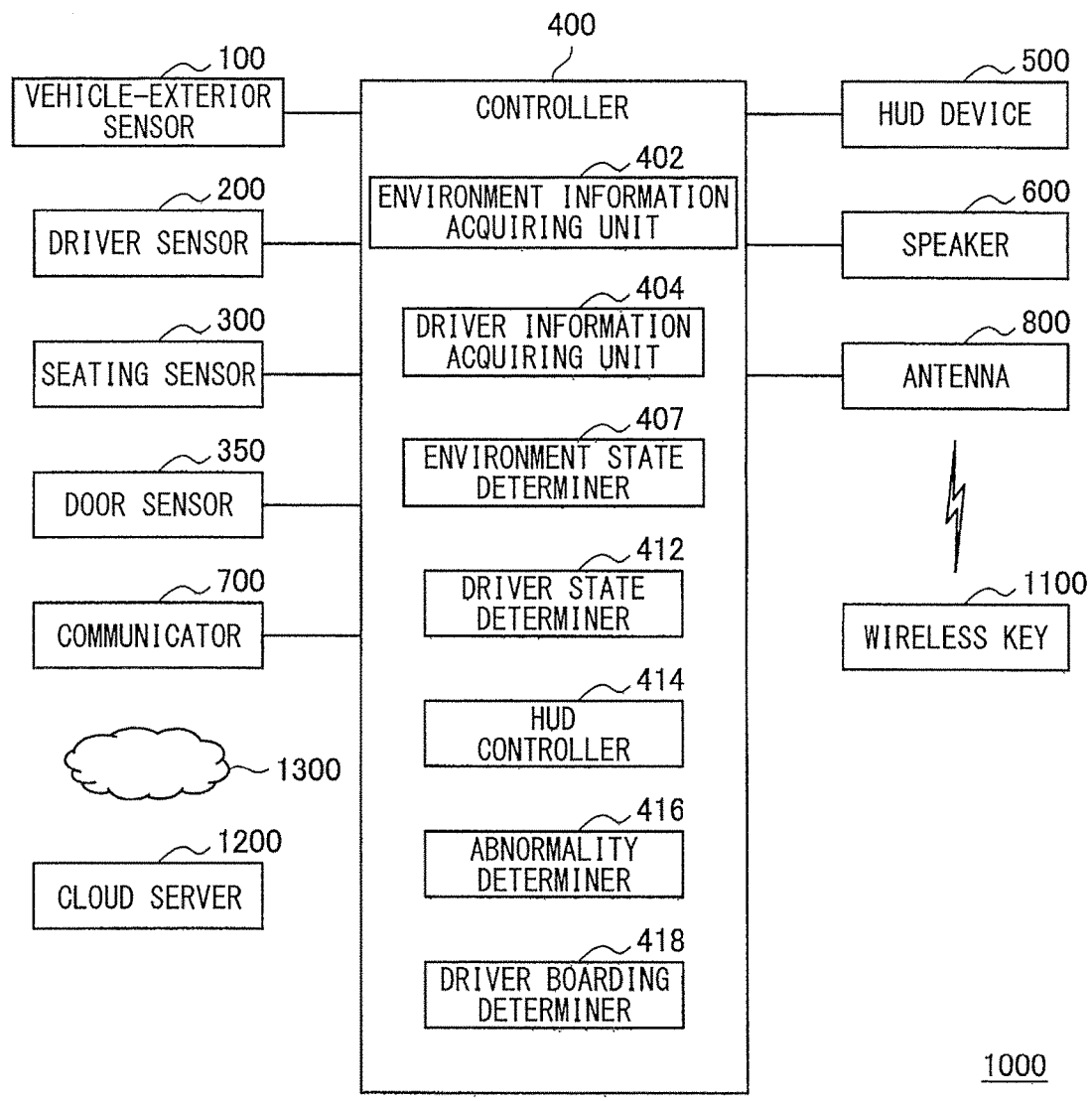
FIG. 1 schematically illustrates an example of a configuration of a vehicle display system according to one implementation of the technology.

A technique disclosed in JP-A No. 2016-136199 is utterly silent as to allow for displaying useful information for a driver when the driver comes close to a vehicle in order to drive the vehicle.

It is desirable to provide a vehicle display system and a method of controlling the vehicle display system that both make it possible to display useful information for a driver when the driver comes close to a vehicle in order to drive the vehicle.

In the following, some non-limiting implementations of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A technique disclosed in JP-A No. 2016-136199 is utterly silent as to allow for displaying useful information for a driver when the driver comes close to a vehicle in order to drive the vehicle. In addition, this technique is also utterly silent as to allow for changing a display on the vehicle, depending on a position of the driver relative to the vehicle. Therefore, there may arise a concern that, when the driver moves away from the display outside the vehicle, he/she has difficulty visually recognize a content of the display.

One implementation of the technology provides a vehicle display system and a method of controlling the vehicle display system that both make it possible to display useful information for the driver when the driver comes close to the vehicle in order to drive the vehicle.

FIG. 1 schematically illustrates an example of a configuration of a vehicle display system 1000 according to one implementation of the technology. The vehicle display system 1000 may be basically mounted in a vehicle. The vehicle may be, for example but not limited to, an automobile. Referring to FIG. 1, the vehicle display system 1000 may include a vehicle-exterior sensor 100, a driver sensor 200, a seating sensor 300, a door sensor 350, a controller 400, a HUD device 500, a speaker 600, a communicator 700, and an antenna 800.

Provided around the vehicle display system 1000 mounted in the vehicle may be a wireless key 1100 and a cloud server 1200. Both of the wireless key 1100 and the cloud server 1200 may be able to communicate with the vehicle display system 1000.

The vehicle-exterior sensor 100 may be a stereo camera, a monocular camera, millimeter wave radar, an infrared sensor, or any other sensing device. The vehicle-exterior sensor 100 may measure a parameter such as, but not limited to, a position and speed of an object. Non-limiting examples of the object may include a vehicle and a person around the vehicle. In an example implementation, the vehicle-exterior sensor 100 may be a stereo camera that includes a pair of right and left cameras each having an imaging device such as, but not limited to, a charge-coupled device (CCD) sensor or a complementary metal-oxide semiconductor (CMOS) sensor. Then, the stereo camera may capture an image of an environment outside the vehicle and transmit information on the captured image to the controller 400. In an example implementation, the stereo camera may be a color camera disposed on an upper portion of a windshield of the vehicle and be able to acquire color information.

The HUD device 500 may be a display device that displays information directly in a human visual field. The HUD device 500 may display a real image on a window such as, but not limited to, the windshield or a rear window of the vehicle. Although a known HUD device typically displays a virtual image, the HUD device 500 in this implementation may be a display device that displays a real image. The HUD device 500 may display a real image at a viewing angle of about 360 degrees, thereby allowing both persons inside and outside the vehicle to view the image. In an alternative implementation, however, the HUD device 500 may display a virtual image.

Figure 2:
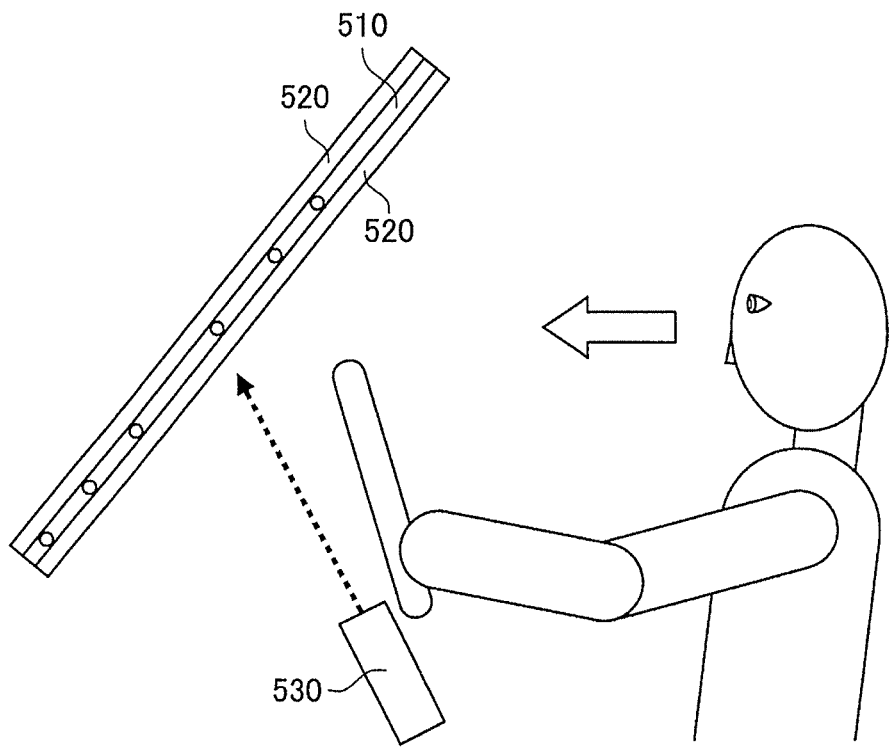
FIG. 2 schematically illustrates an example of a head-up display (HUD) device that includes a self-luminous interlayer film.

In one specific but non-limiting implementation, the HUD device 500 may be a device that includes a self-luminous interlayer film 510, as illustrated in FIG. 2. In such an implementation, the self-luminous interlayer film 510 may be disposed between two sheets of glass 520 in the window of the vehicle such as, but not limited to, the windshield or the rear window. The self-luminous interlayer film 510 may contain a luminescence material. When a portion of the self-luminous interlayer film 510 is irradiated with laser light from a projector 530 mounted in the vehicle, the irradiated portion may emit light, displaying objects, including characters and images. The objects may have visibility at all angles and may be thus viewable not only from the driver seat but also from the other seats as well as any location outside the vehicle. In an alternative implementation, the HUD device 500 may have a configuration in which a self-luminous device is disposed at the window of the vehicle. In such an alternative implementation, the HUD device 500 may have a transparent screen that contains an organic electroluminescence (EL) element, a transmissive liquid crystal device, or any other member that allows for transmissive displaying. In a further alternative implementation, any device other than the HUD device 500 may be used as the display device. In such an alternative implementation, a large-sized liquid crystal display device, a light-emitting diode (LED) display device, or any display device provided on a member such as, but not limited to, an instrument panel may be used as the display device. In the following, a description is given of one implementation in which the HUD device 500 provides a display on the window, such as the windshield or the rear window, of the vehicle. In one implementation, the HUD device 500 may serve as a "display device". The display device according to any implementation of the technology, however, is not limited to the HUD device 500. The term "HUD device" or "display device" according to any implementation of the technology encompasses any and all display devices provided inside and/or outside a vehicle. In an example implementation, the display device may be provided at any external site of the vehicle other than the window, such as a body of the vehicle. In an example implementation, the display device may be provided at any internal site of the vehicle other than the window, such as the instrument panel and a seat. The display devices disposed inside and outside the vehicle may be provided integrally with or separately from each other.

The driver sensor 200 may be implemented by a camera, a line-of-sight sensor, a motion sensor, or any other sensing device. This driver sensor 200 may measure movements of the driver's arms and head, a direction of his/her line of sight, and any other parameters related to the driver. In an example implementation where the driver sensor 200 is a camera, the driver sensor 200 may acquire the movements of the arms and head, the direction of the line of sight, and any other parameters by subjecting an image captured by the camera to image processing. In another example implementation where the driver sensor 200 is a line-of-sight sensor, the driver sensor 200 may detect the line of sight by using a corneal reflection method or any other similar method. The seating sensors 300 may be provided in the respective seats of the vehicle, and each of the seating sensors 300 may determine whether a person sits on a corresponding seat. The door sensors 350 may sense the opening and closing of the respective doors. The speakers 600 may emit a warning sound toward the inside and outside of the vehicle when the HUD device 500 displays a warning to persons inside and outside of the vehicle.

The controller 400 may control the displaying performed by the HUD device 500 on the basis of the information detected by the vehicle-exterior sensors 100, the driver sensor 200, and other sensors. The controller 400 may include an environment information acquiring unit 402, a driver information acquiring unit 404, an environment state determiner 407, a driver state determiner 412, an HUD controller 414, an abnormality determiner 416, and a driver boarding determiner 418. In one implementation, the HUD controller 414 may serve as a "display controller". In one implementation, the environment state determiner 407 may serve as a "determiner". Each of the components of the controller 400 may be implemented in hardware or in software. In an example implementation where one component of the controller 400 is implemented in hardware, this component may be circuitry. In another example implementation where one component of the controller 400 is implemented in software, this component may be a program that causes a central processing unit (CPU) or other processor to perform its function.

The environment information acquiring unit 402 may acquire information on a distance to a target, namely, a subject in this case. This information may be called distance information. In an example implementation, the environment information acquiring unit 402 may generate the distance information, on the basis of an amount of shift between corresponding locations in a pair of right and left stereo images and by means of principle of triangulation. The pair of right and left stereo images may be captured by a set of right and left cameras of the stereo camera which constitutes each vehicle-exterior sensor 100 in one implementation. Together with the acquisition of the distance information, the environment information acquiring unit 402 may also acquire information on a location of the subject from the information on the images captured by the set of right and left cameras of the stereo camera which constitutes each vehicle-exterior sensor 100. This information may be called image information. Further, the environment information acquiring unit 402 may perform a known grouping process on the distance information generated by the principle of triangulation. Then, the environment information acquiring unit 402 may obtain data on a three-dimensional object, a lane line, and other objects by comparing the distance information subjected to the grouping process with preset three-dimensional data such as, but not limited to, three-dimensional object data. By performing the processes in this manner, the controller 400 may be able to recognize various entities, including a person, another vehicle, a stop sign, a stop line, and an electronic toll collection (ETC) gate.

On the basis of the information on the distance to a factor generated by the principle of triangulation, the environment information acquiring unit 402 may also calculate a variation in the distance to the factor and/or a speed relative to the factor. Non-limiting examples of the factor may include a person and another vehicle. The variation in the distance may be determined by integrating distances to the factor in frame images. The frame images may be acquired at regular time intervals. The relative speed may be determined by dividing the distances acquired at regular time intervals by the unit time.

In the above manner, the environment information acquiring unit 402 may acquire the image information regarding an environment outside the vehicle, from the vehicle-exterior sensors 100. In addition, the environment information acquiring unit 402 may analyze the acquired image information through an image analyzing process. As a result of analyzing the image information, the environment information acquiring unit 402 may acquire environment information regarding the environment outside the vehicle.

The antenna 800 may communicate with the wireless key 1100. The wireless key 1100 may transmit a radio wave to the antenna 800. When the antenna 800 receives the radio wave from the wireless key 1100, the vehicle may lock or unlock the doors. Furthermore, when the antenna 800 receives the radio wave from the wireless key 1100, the environment state determiner 407 may determine a position of the driver outside the vehicle and a distance from the vehicle to the driver, on the basis of an intensity of the received radio wave. Details of this operation are described later.

The communicator 700 may communicate with any external device outside the vehicle. The cloud server 1200 may be coupled to the communicator 700 over a network 1300 such as, but not limited to, the Internet. The cloud server 1200 may transmit general information to the communicator 700. Non-limiting examples of the general information may include a weather forecast, traffic information, news, and routing information. The information transmitted to the communicator 700 may be used for a regular display that the HUD controller 414 causes the HUD device 500 to provide. Details of the regular display are described later.

Figure 3:
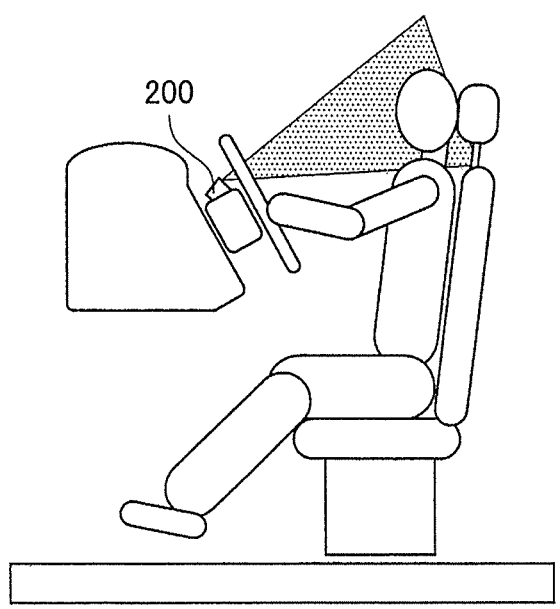
FIG. 3 schematically illustrates an example of a state where a driver sensor captures an image of a driver of a vehicle.

FIG. 3 schematically illustrates an example of a state where the driver sensor 200 captures an image of the driver if the driver sensor 200 is implemented by a camera. As illustrated in FIG. 3, as an example, the driver sensor 200 may be mounted on an upper portion of a steering column.

In an example implementation where the driver sensor 200 is a camera, the image captured by the driver sensor 200 may be supplied to the controller 400. Then, the driver information acquiring unit 404 may acquire information on a face and body of the driver from the received image through an image processing technique such as, but not limited to, an edge and face detection technique. The information on the face and body may be regions of the face and body, for example.

The environment state determiner 407 in the controller 400 may determine an environment state outside the vehicle on the basis of the environment information acquired by the environment information acquiring unit 402. Further, the environment state determiner 407 may set targets to persons outside the vehicle and may determine conditions and positions of the persons, and individual distances between the vehicle and the persons and between the persons. Furthermore, the environment state determiner 407 may determine positions of the targets outside the vehicle and distances between the targets and vehicle, on the basis of the intensity of the radio wave that the antenna 800 has received from the wireless key 1100.

The driver state determiner 412 may determine condition of the driver on the basis of the environment information acquired by the environment information acquiring unit 402. An example of the determination method made by the driver state determiner 412 is described later.

The driver boarding determiner 418 may determine whether the driver boards the vehicle on the basis of the information on the driver acquired by the driver information acquiring unit 404 and the information acquired by the door sensors 350. When the information acquired from the door sensors 350 indicates that at least one of the doors is opened and closed and the information acquired from the driver information acquiring unit 404 indicates that the driver is at the driver seat, the driver boarding determiner 418 may determine that the driver boards the vehicle.

The HUD controller 414 may control the displaying performed by the HUD device 500. In an example implementation, the HUD controller 414 may control the displaying of the HUD device 500 on the basis of the determination results of the environment state determiner 407 and the driver state determiner 412.

The abnormality determiner 416 may determine whether an abnormality occurs in the vehicle. In an example implementation, the abnormality determiner 416 may determine whether an abnormality occurs in the vehicle, on the basis of various pieces of sensor information acquired over a controller area network (CAN) mounted in the vehicle. Non-limiting example of the abnormality in the vehicle determined by the abnormality determiner 416 may include lowering of an air pressure, an oil temperature, an oil level, and a battery voltage.

Figure 4:
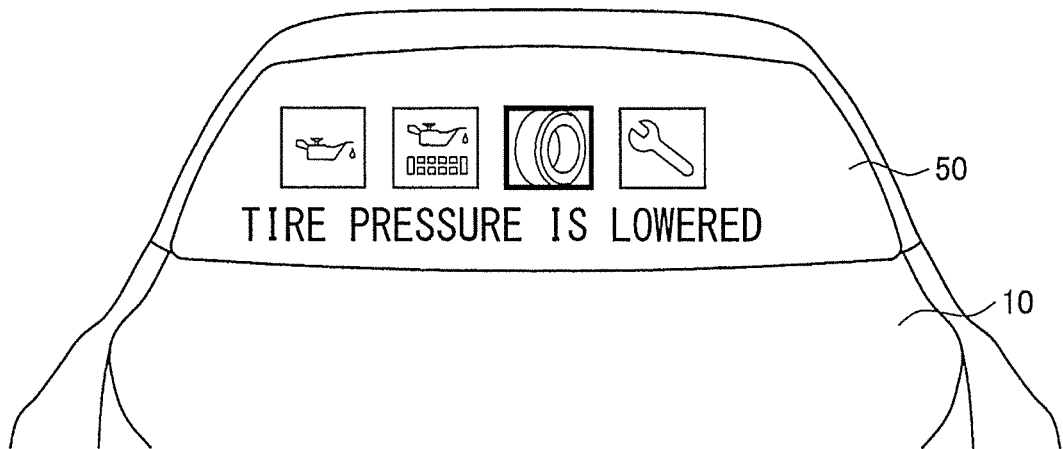
FIG. 4 schematically illustrates an example of a display that the HUD device provides on a windshield of the vehicle.
Figure 5:
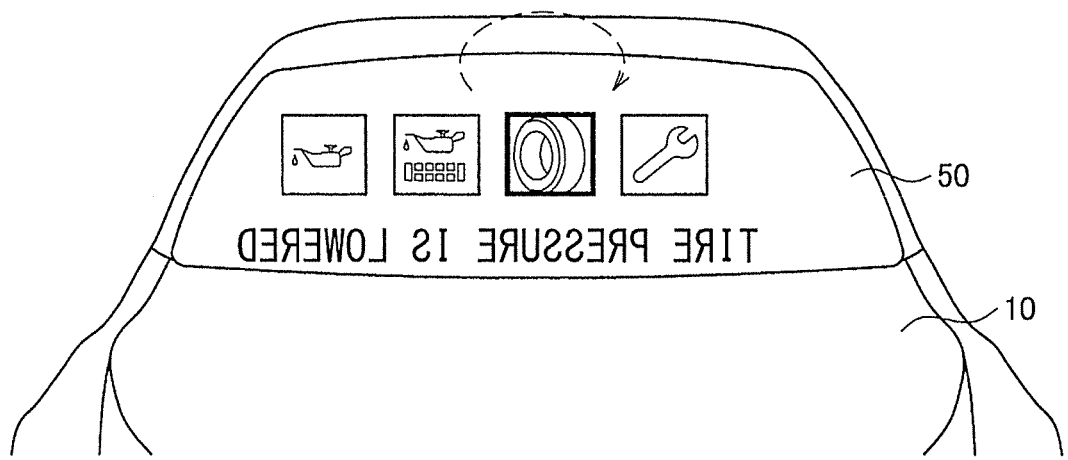
FIG. 5 schematically illustrates another example of the display that the HUD device provides on the windshield of the vehicle.
Figure 6:
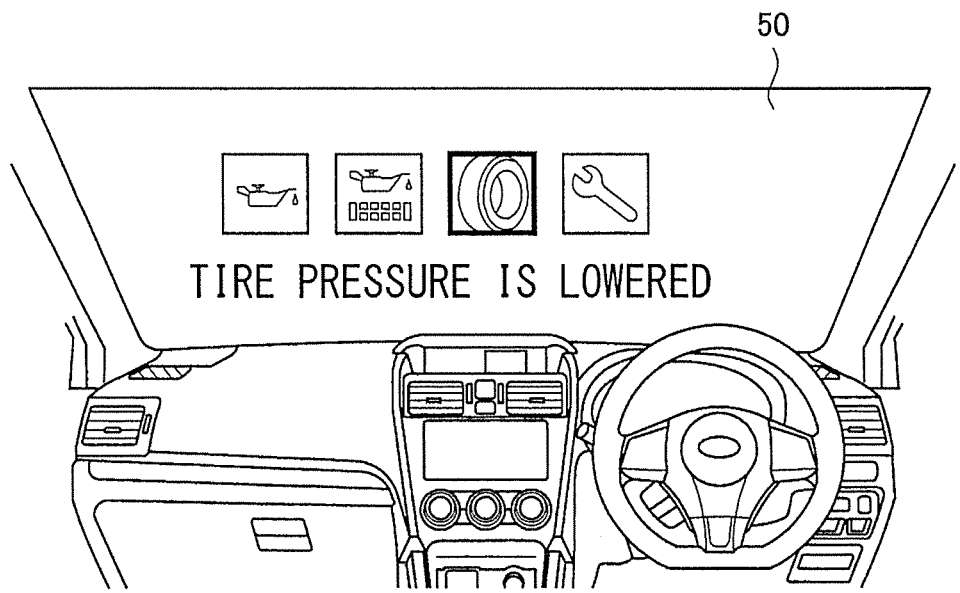
FIG. 6 schematically illustrates further another example of the display that the HUD device provides on the windshield of the vehicle.

In one implementation, when the driver comes close to the vehicle in order to drive the vehicle, the HUD device 500 may provide a display on the window of the vehicle. FIGS. 4 to 6 schematically illustrate examples of a display that the HUD device 500 provides on a windshield 50 of a vehicle 10. These examples are based on the premise that an abnormality or other issue occurs in the vehicle 10 upon boarding of the driver. In the example of FIG. 4, the HUD device 500 provides the display for the driver outside the vehicle 10, thereby giving a warning to the driver that a tire pressure is lowered. As an alternative example, instead of the warning that the tire pressure is lowered, the HUD device 500 may display other warning information, such as information indicating that the oil temperature, the oil level, or the battery voltage is lowered. For example, when the environment state determiner 407 determines that the driver comes close to the vehicle 10 and the abnormality determiner 416 determines that an abnormality occurs in the vehicle 10, the HUD controller 414 may control the displaying of the HUD device 500 on the basis of the determination results of the environment state determiner 407 and the abnormality determiner 416. In this way, the HUD controller 414 may control a display as illustrated in FIG. 4. In one specific but non-limiting implementation, the environment state determiner 407 may determine that the driver comes close to the vehicle 10 when a distance between the driver and the vehicle 10 becomes equal to or less than a predetermined threshold.

FIGS. 5 and 6 schematically illustrate examples in which the door sensor 350 detects an entry of the driver in the vehicle 10 while the HUD device 500 provides the display of FIG. 4, and a display for the inside of the vehicle 10 is performed accordingly. FIG. 5 illustrates the display as seen from the outside of the vehicle 10. FIG. 6 illustrates the display as seen from the inside of the vehicle 10. In examples of FIGS. 5 and 6, the displays on the windshield 50 may be equivalent to an inversion of the display of FIG. 4. As in these examples, when the driver boards the vehicle 10, the HUD device 500 may invert the display of FIG. 4, cause the display to blink, or may perform any other method that calls the driver's attention, thereby enabling the driver to continuously recognize the warning in the display even after he/she has entered the vehicle 10. In an alternative implementation, when the driver boards the vehicle 10, the HUD device 500 may switch the display for the outside of the vehicle 10 to another display. For example, when the driver boarding determiner 418 determines that the driver boards the vehicle 10, the HUD controller 414 may control the HUD device 500 to switch the display for the outside of the vehicle 10 to the display for the inside of the vehicle 10.

As described above, when an abnormality occurs in the vehicle 10, the HUD device 500 may display a warning toward the outside of the vehicle 10 before the driver enters the vehicle 10. This configuration makes it possible to promptly inform the driver of the occurrence of the abnormality. The example of FIG. 4 helps the driver to view the warning and check the air pressure before entering the vehicle 10. As a result, the driver is able to reliably recognize the occurrence of the abnormality in the vehicle 10 at an early stage before driving the vehicle 10. In other words, the driver is able to acquire useful information for use in driving the vehicle 10.

Figure 7:
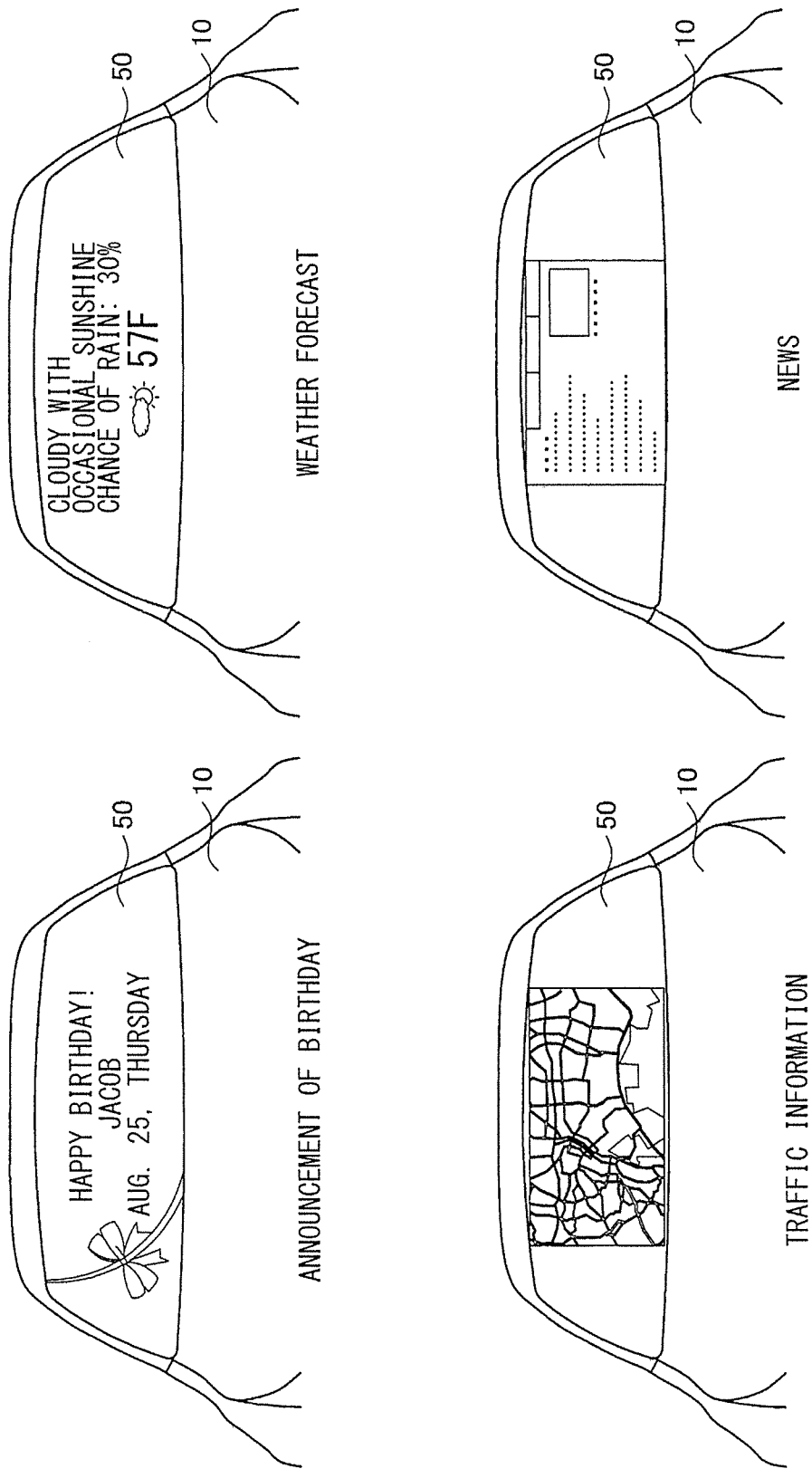
FIG. 7 schematically illustrates examples of a display to be provided in a case where no abnormalities occur in the vehicle when the driver boards the vehicle.

FIG. 7 schematically illustrates examples of a display that the HUD device 500 provides on the windshield 50 of the vehicle 10. One example illustrated in FIG. 7 is based on the premise that an abnormality or other issue does not occur in the vehicle 10 upon boarding of the driver. As illustrated in FIG. 7, when an abnormality or other issue does not occur in the vehicle 10, the HUD controller 414 may control the HUD device 500 to provide the regular display. The regular display may indicate that the vehicle 10 is in normal condition. The regular display may also indicate general information that contains, for example but not limited to, an announcement of a birthday, a photograph, a painting, a weather forecast, traffic information, routing information, news, or any other information in general.

Figure 8:
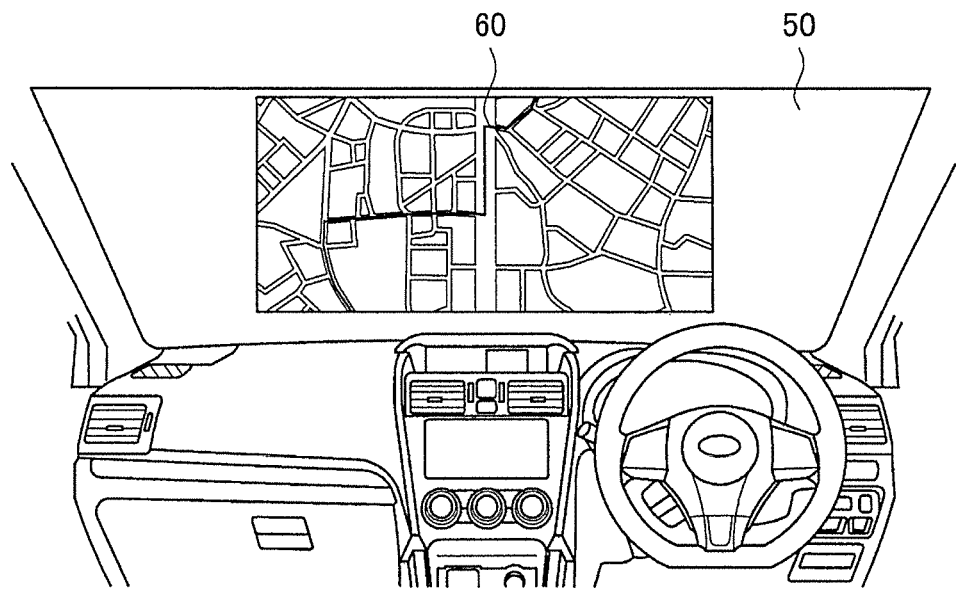
FIG. 8 schematically illustrates an example of a display to be provided for an inside of the vehicle when an entry of the driver in the vehicle is detected while the display of FIG. 7 is provided.

FIG. 8 schematically illustrates an example in which the door sensor 350 detects the entry of the driver in the vehicle 10 while the HUD device 500 provides the display of FIG. 7, and a display for the inside of the vehicle 10 is performed accordingly. In one example of FIG. 8, the HUD device 500 may display routing information 60 on the windshield 50. Even after the driver has entered the vehicle 10, the HUD device 500 may continue to provide the display of FIG. 7. In an alternative implementation, the HUD device 500 may provide another display after the driver has entered the vehicle 10. In an example implementation where the display of FIG. 7 is continued to be provided after the driver has entered the vehicle 10, the HUD device 500 may invert front and back of the display.

Figure 9:
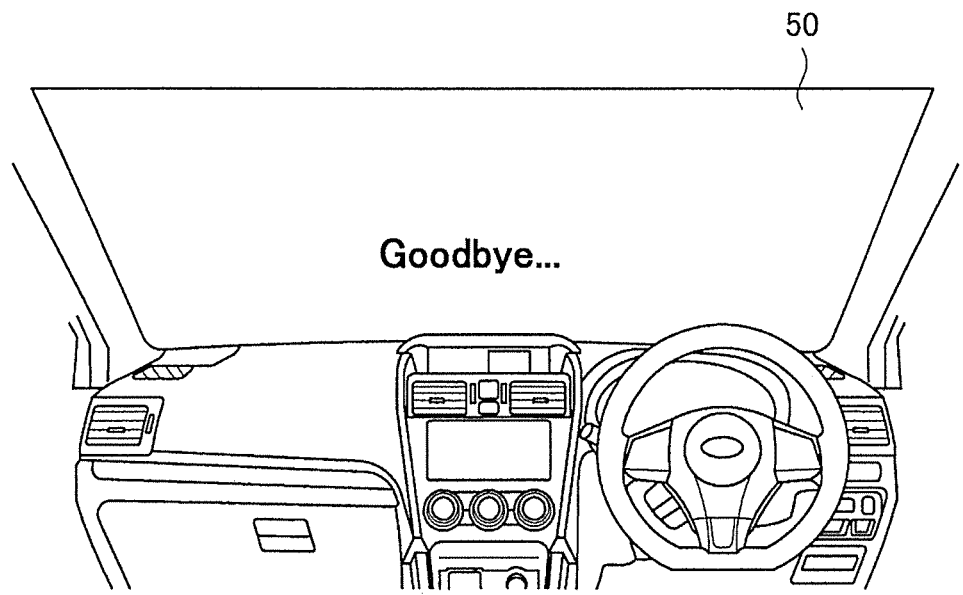
FIG. 9 schematically illustrates an example of a display on the windshield of the vehicle which is to be provided for the driver inside the vehicle when the driver turns off an ignition switch.
Figure 10:
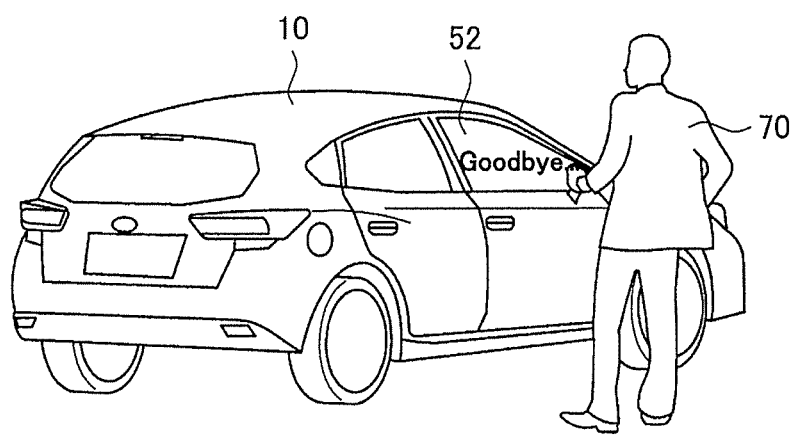
FIG. 10 schematically illustrates an example of a manner in which a display for the inside of the vehicle is switched to a display for the outside of the vehicle when an exit of the driver from the vehicle is detected while the display of FIG. 9 is provided.

FIG. 9 schematically illustrates an example of a display for the driver inside the vehicle 10 that the HUD device 500 provides on the windshield 50 of the vehicle 10 when the driver turns off an ignition switch (IG_SW). FIG. 10 schematically illustrates an example of a manner in which the HUD device 500 switches the display for the inside of the vehicle 10 to the display for the outside of the vehicle 10, where the door sensor 350 detects an exit of a driver 70 from the vehicle 10 while the HUD device 500 provides the display of FIG. 9. In one example of FIG. 10, the HUD device 500 may provide a display for the outside on a window 52 located on the driver seat side. When the driver boarding determiner 418 determines that the driver 70 exits from the vehicle 10, the HUD controller 414 may control the HUD device 500 to switch the display for the inside of the vehicle 10 to the display for the outside of the vehicle 10. By switching the displays in response to the exit of the driver 70 from the vehicle 10, it is possible to continue sending a message to the driver 70. The HUD device 500 may clear the display for the outside of the vehicle 10 after a predetermined period has passed.

FIG. 11 schematically illustrates examples in which, when the driver 70 moves around the vehicle 10, the HUD device 500 switches a window on which a display is to be provided to another window, depending on a position of the driver 70. As in the left example in FIG. 11, when the driver 70 is present near the driver seat, the HUD device 500 may provide the display on a window 52 located on the driver seat side. As in the right example in FIG. 11, when the driver 70 moves to the rear of the vehicle 10, the HUD device 500 may provide the display on a rear window 54 of the vehicle 10. Likewise, when the driver 70 moves to the front of the vehicle 10, the HUD device 500 may provide the display on the windshield 50 of the vehicle 10. In an example case where the driver 70 comes close to the front of the vehicle 10 and then enters the vehicle 10 from a door located on the driver seat side, the HUD device 500 may first provide the display on the windshield 50, and in turn may provide the display on the window 52 on the driver seat side in accordance with the movement of the driver 70 to the driver seat. In which case, the driver 70 is able to reliably view the display for the outside of the vehicle 10. For example, the environment state determiner 407 may determine a position of a person outside the vehicle, and then the HUD controller 414 may control the displaying the HUD device 500 on the basis of the determination result of the environment state determiner 407. In this way, the HUD controller 414 may control a display as illustrated in FIG. 11.

Figure 12:
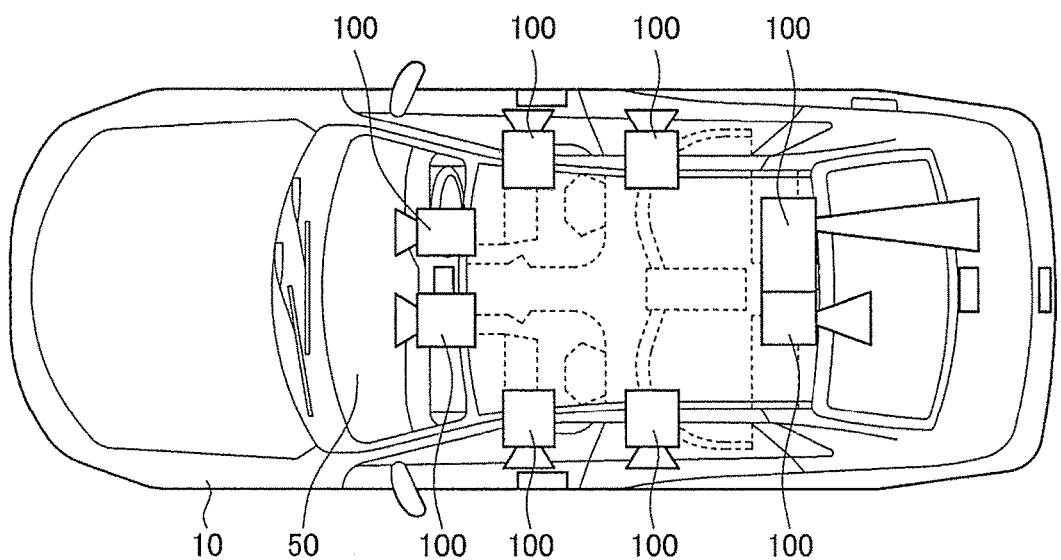
FIG. 12 schematically illustrates an example of a method of detecting the driver present outside the vehicle.
Figure 13:
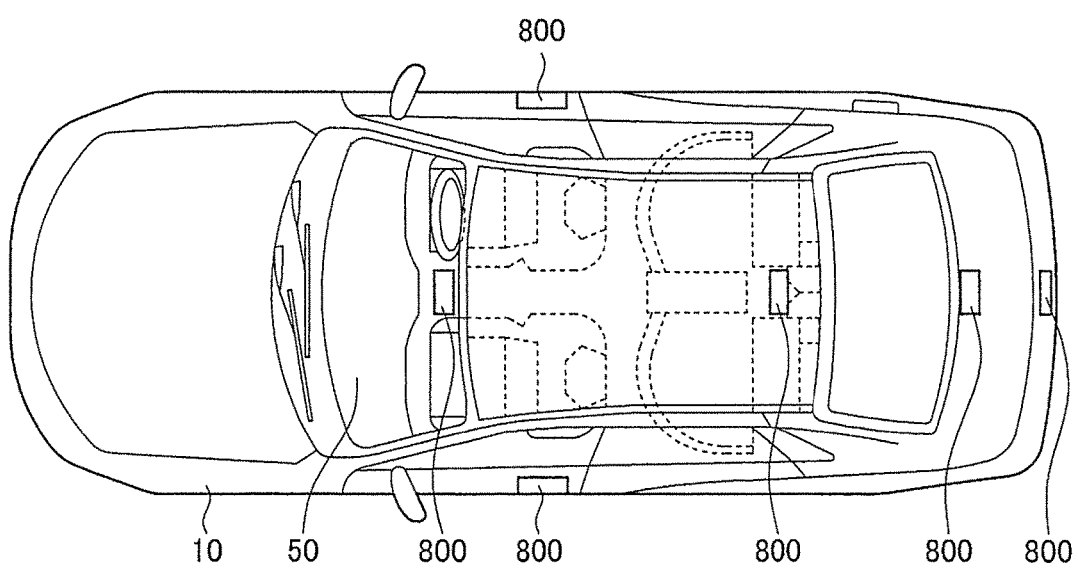
FIG. 13 schematically illustrates another example of the method of detecting the driver present outside the vehicle.

FIGS. 12 and 13 each schematically illustrate an example of a method of detecting the driver 70 outside the vehicle 10. FIG. 12 schematically illustrates an example of a method of detecting the driver 70 by means of the vehicle-exterior sensors 100. As illustrated in FIG. 12, the vehicle-exterior sensors 100 may be provided in the vehicle 10 at a plurality of sites. The environment information acquiring unit 402 may recognize the driver 70 outside the vehicle 10 and measure a distance to the driver 70. For example, the environment information acquiring unit 402 may recognize the driver 70 outside the vehicle by means of the above-described image recognition technique. Then, the environment state determiner 407 may determine whether the distance to the driver 70 is equal to or less than the predetermined threshold. When the distance to the driver 70 is equal to or less than the predetermined threshold, the HUD controller 414 may control the HUD device 500 to provide a display for the outside of the vehicle 10.

The environment state determiner 407 may determine a position of the driver 70 on the basis of the position information on the driver 70 that the environment information acquiring unit 402 has recognized by means of the image recognition. On the basis of this determination result, the HUD device 500 may provide a display for the outside of the vehicle 10 on the window located near the driver 70. In alternative implementation, the HUD device 500 may provide a display for the outside of the vehicle 10 on the window located nearest the driver 70.

FIG. 13 schematically illustrates an example of a method of detecting the driver 70 by means of the wireless key 1100. As illustrated in FIG. 13, the antennas 800 may be installed in the front, rear, right, and left portions of the vehicle 10. These antennas 800 may receive the radio wave emitted from the wireless key 1100. Then, the environment state determiner 407 may determine whether an intensity of the radio wave that the antennas 800 have received from the wireless key 1100 is equal to or higher than a predetermined threshold. When the intensity of the received radio wave is equal to or higher than the predetermined threshold, the environment state determiner 407 may determine that the driver 70 is present near the vehicle 10. In response, the HUD device 500 may provide a display for the outside of the vehicle 10.

Figure 14:
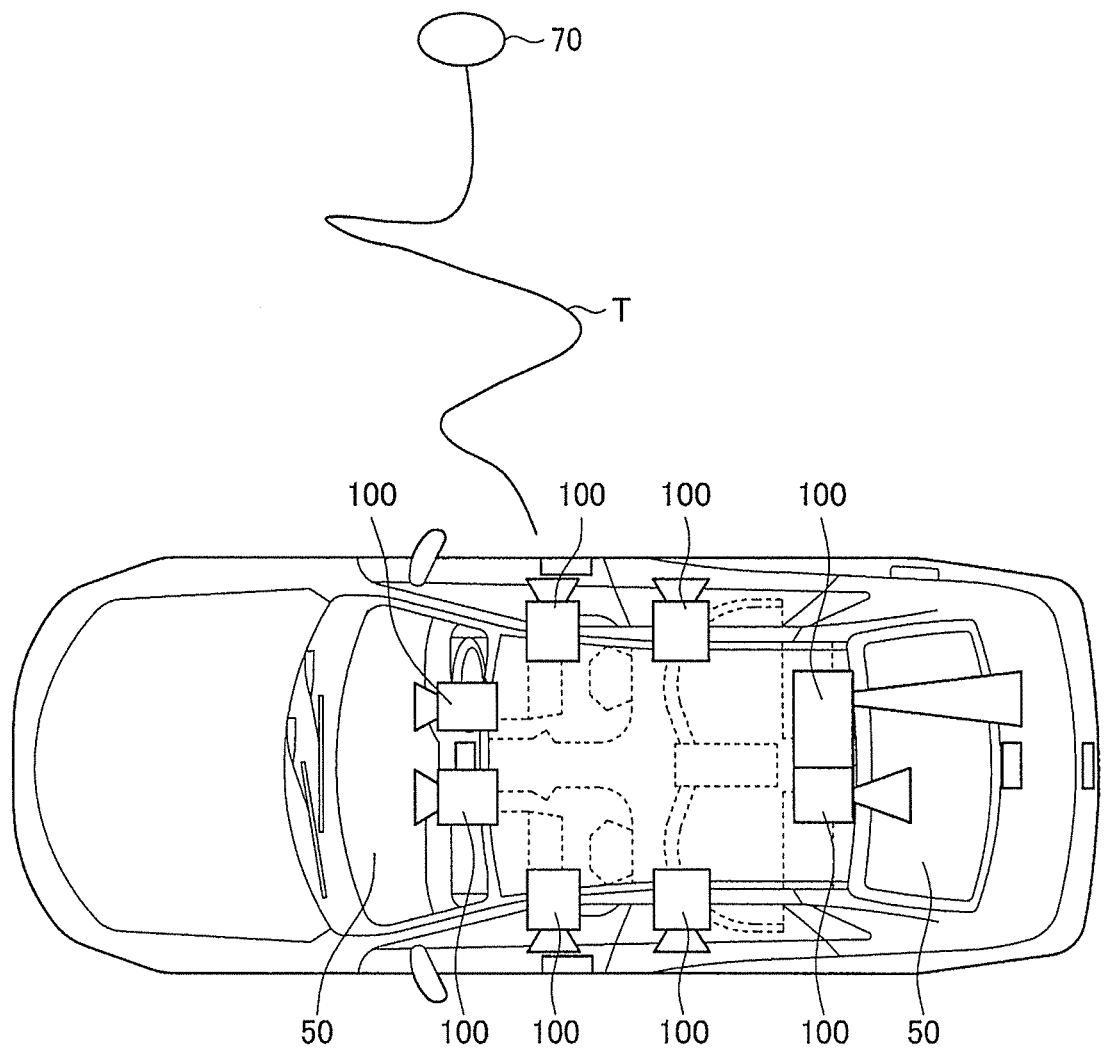
FIG. 14 schematically illustrates an example of a manner in which a driver state determiner determines condition of the driver.

FIG. 14 schematically illustrates an example of a manner in which the driver state determiner 412 determines condition of the driver 70. As described above, the driver state determiner 412 may determine condition of the driver 70 on the basis of the environment information acquired by the environment information acquiring unit 402. One example illustrated in FIG. 14 is based on the premise that the driver 70 comes close to the vehicle 10 with a stagger along a trajectory T. The environment information acquiring unit 402 may acquire positions of the driver 70 and distances between the driver 70 and the vehicle 10 by means of the image recognition, thereby determining the trajectory T. Then, the driver state determiner 412 may determine condition, or a behavior, of the driver 70 on the basis of the determined trajectory T.

When a lateral stagger of the driver 70 is larger than a predetermined threshold amount, the driver state determiner 412 may determine that the driver 70 is in abnormal condition. For example, the driver state determiner 412 may determine that the driver 70 is in abnormal condition when a lateral displacement of the driver 70 over a preset period is larger than a predetermined threshold amount. In an alternative implementation, when a speed at which the driver 70 moves to the vehicle 10 is higher than a predetermined threshold speed, the driver state determiner 412 may determine that the driver 70 is in abnormal condition. The predetermined threshold amount or the predetermined threshold speed may be based on an average value obtained in advance. For example, when the lateral displacement of the driver 70 over the preset period is larger than the predetermined threshold amount or when the moving speed of the driver 70 is higher than the predetermined threshold speed, the driver state determiner 412 may determine that the driver 70 is fatigued and that the driver 70 is in abnormal condition accordingly.

If only a specific person drives the vehicle 10 as the driver 70, the predetermined threshold amount or the predetermined threshold speed may be set on the basis of a normal value. The normal value may be determined from the specific driver 70 being in regular condition. For example, the predetermined threshold amount or the predetermined threshold speed may be set to a value that is based on a product of the normal value of the specific driver 70 and a preset coefficient. The normal value of the specific driver 70 may be determined through learning. When the lateral displacement of the specific driver 70 over the preset period is larger than the predetermined threshold amount based on the normal value or when the moving speed of the specific driver 70 is higher than the predetermined threshold speed based on the normal value, the driver state determiner 412 may determine that the specific driver 70 is fatigued and that the driver 70 is in abnormal condition accordingly.

Figure 15:
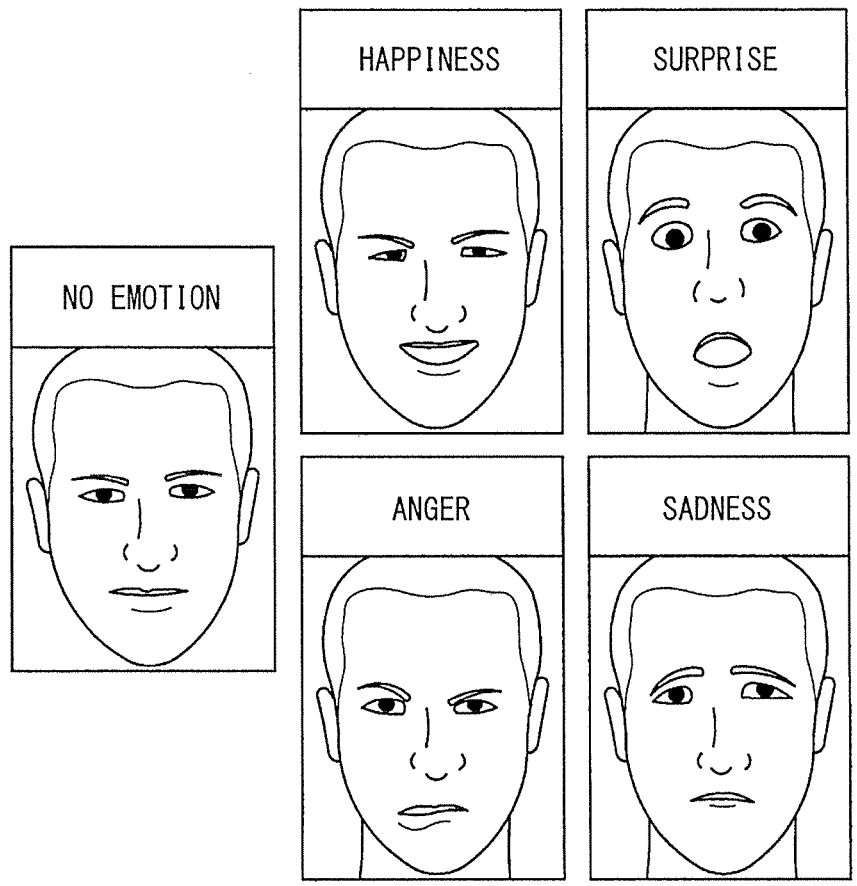
FIG. 15 schematically illustrates an example of a method in which the driver state determiner determines a facial expression of the driver.
Figure 16:
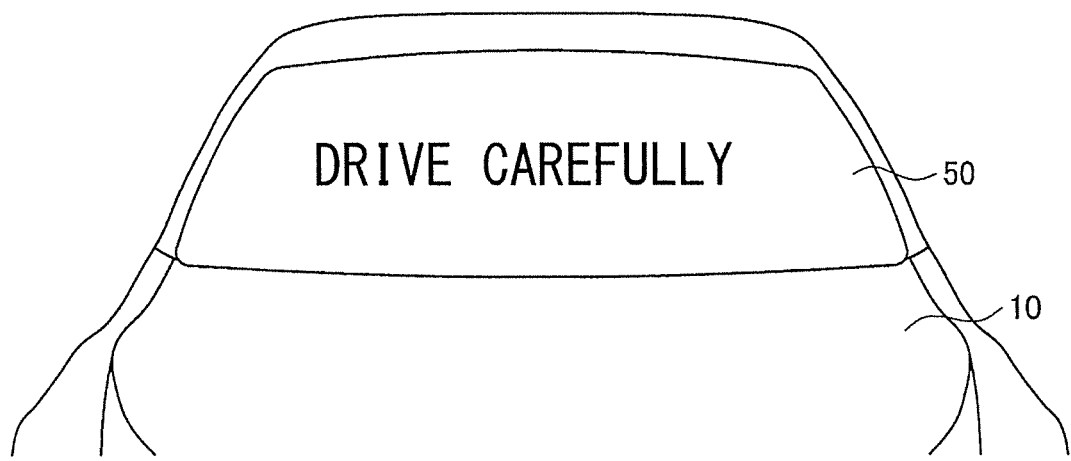
FIG. 16 schematically illustrates an example of a warning display to be provided when an abnormality occurs in the driver.

FIG. 15 schematically illustrates an example of a method in which the driver state determiner 412 determines a facial expression of the driver 70. As illustrated in FIG. 15, some pieces of image information on a facial expression may be stored in advance in relation to happiness, surprise, anger, sadness, and other feelings. The driver state determiner 412 may compare image information on the face of the driver 70 which the environment information acquiring unit 402 has acquired and the pieces of image information as illustrated in FIG. 15 stored in advance. The driver state determiner 412 may select, from the pieces of image information illustrated in FIG. 15, any image information that is high in similarly to the image information on the face of the driver 70. Then, the driver state determiner 412 may determine condition, or a feeling, of the driver 70 on the basis of the selected image information. When the driver 70 is very angry, very sad, or very sleepy, for example, the driver state determiner 412 may determine that the driver 70 is in abnormal condition. In such an implementation, as illustrated in FIG. 16, the HUD device 500 may display a message saying "DRIVE CAREFULLY" toward the outside of the vehicle 10, thereby giving a warning to the driver 70. Accordingly, the driver state determiner 412 may determine whether the driver 70 is in abnormal condition. Then, the HUD controller 414 may control the displaying of the HUD device 500 on the basis of the determination result of the driver state determiner 412. In this way, the vehicle display system 1000 may provide a display as illustrated in FIG. 16.

Figure 17:
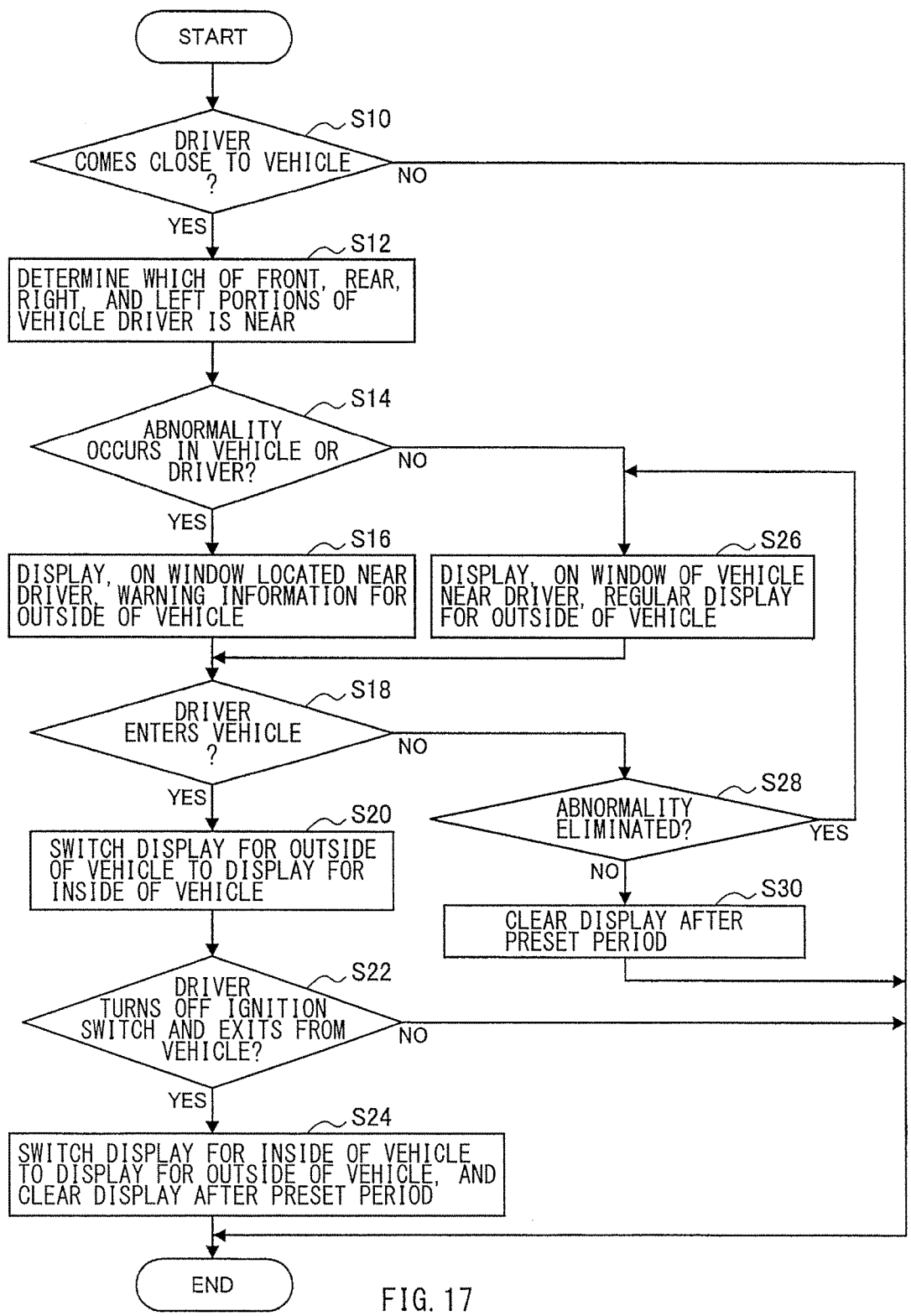
FIG. 17 is a flowchart of an example of a process according to one implementation.

FIG. 17 is a flowchart of an example of a process according to one implementation. In step S10, the environment state determiner 407 may determine whether the driver 70 comes close to the vehicle 10, on the basis of the information acquired from the vehicle-exterior sensors 100 or the intensity of the radio wave received from the wireless key 1100. When the environment state determiner 407 determines that the driver 70 comes close to the vehicle 10 (S10: YES), the flow may proceed to step S12. In step S12, the environment state determiner 407 may determine which of the front, rear, right, and left portions of the vehicle 10 the driver 70 is near, on the basis of the information acquired from the vehicle-exterior sensors 100 or the intensity of the radio wave received from the wireless key 1100. In an alternative implementation, the environment state determiner 407 may determine which of the front, rear, right, and left portions of the vehicle 10 the driver 70 is nearest.

In step S14, the abnormality determiner 416 may determine whether an abnormality occurs in the vehicle 10, and the driver state determiner 412 may determine whether an abnormality occurs in the driver 70. When it is determined that an abnormality occurs in one or both of the vehicle 10 and the driver 70 (S14: YES), the flow may proceed to step S16. In step S16, the HUD controller 414 may control the HUD device 500 to display, on a window of the vehicle 10, information for the outside of the vehicle 10 which indicates the occurrence of the abnormality. In such an implementation, the HUD controller 414 may control the HUD device 500 to display the information on the window located near the driver 70. In an alternative implementation, the HUD controller 414 may control the HUD device 500 to display the information on the window located nearest the driver 70. In step S18, the driver boarding determiner 418 may determine whether the driver 70 enters the vehicle 10. When it is determined that the driver 70 enters the vehicle 10 (S18: YES), the flow may proceed to step S20. In step S20, the HUD controller 414 may control the HUD device 500 to switch the display for the outside of the vehicle 10 to the display for the inside of the vehicle 10.

In step S22, the driver boarding determiner 418 may determine whether the driver 70 turns off the ignition switch and exits from the vehicle 10. When it is determined that the driver 70 turns off the ignition switch and exits from the vehicle 10 (S22: YES), the flow may proceed to step S24. In step S24, the HUD controller 414 may control the HUD device 500 to switch the display for the inside of the vehicle 10 to the display for the outside of the vehicle 10, and may clear the display after the preset period has passed. After the step S24 has been performed, the process may be concluded (END).

When it is determined in step S14 that an abnormality does not occur in both of the vehicle 10 and the driver 70 (S14: NO), the flow may proceed to step S26. In step S26, the HUD controller 414 may control the HUD device 500 to provide the regular display on a window of the vehicle 10. After the step S26 has been performed, the flow may proceed to step S18.

When it is determined in step S18 that the driver 70 does not enter the vehicle 10 (S18: NO), the flow may proceed to step S28. In step S28, the abnormality determiner 416 may determine whether the abnormality is eliminated. When it is determined in step S28 that the abnormality is eliminated (S28: YES), the flow may proceed to step S26 in which the HUD controller 414 may control the HUD device 500 to provide the regular display on a window of the vehicle 10. When it is determined in step S28 that the abnormality is not eliminated (S28: NO), the flow may proceed to step S30. In step S30, the HUD controller 414 may control the HUD device 500 to clear the display after the preset period has passed. After the step S30 has been performed, the process may be concluded (END). Note that the process may also be concluded (END) when the environment state determiner 407 determines in step S10 that the driver 70 does not come close to the vehicle 10 (S10: NO).

According to one implementation, as described above, it is possible for the vehicle display system 1000 to display a message in such a way that persons inside and outside a vehicle are able to reliably identify for which target this message is intended. For example, when the driver 70 comes close to the vehicle 10, the vehicle display system 1000 displays information on a window of the vehicle 10, thereby enabling the driver 70 to recognize various pieces of information before driving. Moreover, the vehicle display system 1000 may switch a window on which the information is to be displayed to another window, depending on movement of the driver 70 outside the vehicle, thereby enabling the driver 70 to reliably recognize the information even when he/she moves.

The controller 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 400 illustrated in FIG. 1.

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display system comprising:
   a display device configured to provide a first image on windows of a vehicle; and
   a controller configured to:
   detect, outside the vehicle, a driver of the vehicle within a threshold distance of the vehicle;
   determine a position of the driver outside the vehicle; and
   control, in response to determining the position of the driver, the display device to provide the first image towards outside the vehicle on a first window of the windows, wherein the first window is located closer to the position of the driver than other windows of the vehicle.

2. The vehicle display system according to claim 1, wherein when the controller detects a change in the position of the driver outside the vehicle, the controller controls the display device to provide the first image towards outside the vehicle on a second window of the windows,
   wherein the second window is located closer to the changed position of the driver than other windows of the vehicle.

3. The vehicle display system according to claim 1, wherein the controller is configured to detect an abnormality of the vehicle,
   wherein the controller controls, in response to detecting the abnormality of the vehicle, the display device to provide, on the first window, a second image indicating that the abnormality of the vehicle.

4. The vehicle display system according to claim 1, wherein the controller controls the display device to provide the first image for the outside of the vehicle, when the abnormality of the vehicle is not detected.

5. The vehicle display system according to claim 4, wherein the first image comprises one or more of a message intended for the driver, a weather forecast, news, traffic information, and routing information.

6. The vehicle display system according to claim 4, further comprising a communicator configured to communicate with an external server,
   wherein information regarding the first image is acquired by the communicator from the external server.

7. The vehicle display system according to claim 1, wherein the controller is configured to determine that the driver is inside the vehicle,
   wherein the controller controls, in response to determining that the driver is inside the vehicle, the display device to provide the first image towards inside the vehicle on the first window.

8. The vehicle display system according to claim 7, wherein the controller controls the display device to provide the first image towards inside the vehicle on the first window by inverting front and back of the first image provided towards outside the vehicle.

9. The vehicle display system according to claim 1, wherein the controller is configured to detect an abnormality of the driver,
   wherein the controller controls, in response to detecting the abnormality of the vehicle, the display device to provide a third image based on the abnormality of the driver, and
   wherein the controller controls the display device to provide the third image on the first window.

10. A vehicle display system comprising:
    a display device configured to provide a first image on windows of a vehicle; and
    a controller configured to:
    determine that a driver is inside the vehicle;
    control, in response to determining that the driver is inside the vehicle, the display device to provide a first image towards inside the vehicle;
    determine that the driver exists the vehicle;
    determine a position of the driver outside the vehicle; and
    control, in response to determining the position of the driver, the display device to provide the first image towards outside the vehicle on a first window of the windows, wherein the first window is located closer to the position of the driver than other windows of the vehicle.

11. The vehicle display system according to claim 10, wherein when the controller detects a change in the position of the driver outside the vehicle, the controller controls the display device to provide the first image towards outside the vehicle on a second window of the windows,
    wherein the second window is located closer to the changed position of the driver than other windows of the windows of the vehicle.

12. A method of controlling a vehicle display system, the method comprising:
    detecting, outside a vehicle, a driver of the vehicle within a threshold distance of the vehicle, the vehicle including a display device that provides an image on windows of the vehicle;
    determining a position of the driver outside the vehicle; and
    controlling, in response to determining the position of the driver, the display device to provide the image towards outside the vehicle on a first window of the windows, wherein the first window is located closer to the position of the driver than other windows of the vehicle.

13. A method of controlling a vehicle display system, the method comprising:
    determining that a driver is inside a vehicle, the vehicle including a display device that provides an image on windows of the vehicle; and
    controlling, in response to determining that the driver is inside the vehicle, the display device to provide the image towards inside the vehicle;
    determining that the driver exits the vehicle; and
    determining a position of the driver outside the vehicle; and
    controlling, in response to determining the position of the driver, the display device to provide the image towards outside the vehicle on a first window of the windows, wherein the first window is located closer to the position of the driver than other windows of the vehicle.

14. A vehicle display system comprising:

a display device configured to provide an image on windows of a vehicle; and circuitry configured to:

detect, outside the vehicle, a driver of the vehicle within a threshold distance of the vehicle;

determine a position of the driver outside the vehicle; and control, in response to determining the position of the driver, the display device to provide the image towards outside the vehicle on a first window of the windows, wherein the first window is located closer to the position of the driver than other windows of the windows of the vehicle.

15. A vehicle display system comprising:

a display device configured to provide an image on windows of a vehicle; and circuitry configured to determine that a driver is inside the vehicle;

control, in response to determining that the driver is inside the vehicle, the display device to provide the image towards inside the vehicle;

determine that the driver exists the vehicle; and determine a position of the driver outside the vehicle; and control, in response to determining the position of the driver, the display device to provide the image towards outside the vehicle on a first window of the windows, wherein the first window is located closer to the position of the driver than other windows of the vehicle.

* * * * *